(12) United States Patent
Sakuma

(10) Patent No.: US 11,906,538 B2
(45) Date of Patent: Feb. 20, 2024

(54) SENSOR MODULE

(71) Applicant: SEIKO EPSON CORPORATION, Tokyo (JP)

(72) Inventor: Masayasu Sakuma, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 68 days.

(21) Appl. No.: 17/577,779

(22) Filed: Jan. 18, 2022

(65) Prior Publication Data

US 2022/0229085 A1 Jul. 21, 2022

(30) Foreign Application Priority Data

Jan. 20, 2021 (JP) .................................. 2021-007141

(51) Int. Cl.
*G01P 1/02* (2006.01)
*G01C 19/5628* (2012.01)
*G01P 15/08* (2006.01)
*G01P 3/44* (2006.01)

(52) U.S. Cl.
CPC ............ *G01P 15/0802* (2013.01); *G01P 3/44* (2013.01)

(58) Field of Classification Search
CPC .................................................. B81B 7/0051
See application file for complete search history.

(56) References Cited

U.S. PATENT DOCUMENTS

| 8,794,065 B1 * | 8/2014 | Yang ...................... G01P 1/023 |
| | | 73/504.16 |
| 10,194,526 B1 * | 1/2019 | Simula ................. H05K 1/0271 |
| 2008/0257044 A1 * | 10/2008 | Watanabe .......... G01C 19/5663 |
| | | 73/504.15 |
| 2016/0195394 A1 * | 7/2016 | Sato ..................... G01C 19/5783 |
| | | 73/504.04 |
| 2017/0336436 A1 | 11/2017 | Maegawa et al. |
| 2019/0162619 A1 * | 5/2019 | Furuhata ................ G01L 19/148 |
| 2019/0320526 A1 * | 10/2019 | Sato ........................ H05K 1/181 |

FOREIGN PATENT DOCUMENTS

| JP | 09321445 A | * | 12/1997 | |
| JP | H1098275 A | * | 4/1998 | |
| JP | 2004-031787 | | 1/2004 | |
| JP | 2006344812 A | * | 12/2006 | |
| JP | 2011-085441 | | 4/2011 | |
| WO | WO-2010110294 A1 | * | 9/2010 | ............. G01P 1/023 |
| WO | 2016/114114 | | 7/2016 | |
| WO | WO-2019181626 A1 | * | 9/2019 | ............. H05K 1/111 |

* cited by examiner

*Primary Examiner* — Jill E Culler
*Assistant Examiner* — Ruben C Parco, Jr.
(74) *Attorney, Agent, or Firm* — Rankin, Hill & Clark LLP

(57) ABSTRACT

A sensor module includes: a printed circuit board having a first recessed portion formed at a first side, a second recessed portion formed at a second side facing the first side, a third recessed portion formed at a third side, and a fourth recessed portion formed at a fourth side facing the third side; a metal cap including convex portions each bonded to a respective one of the first to fourth recessed portions; and a first inertial sensor and a second inertial sensor that are provided at a main surface of the printed circuit board. The first inertial sensor and the second inertial sensor are disposed outside a region surrounded by a line connecting both ends of the first recessed portion and the second recessed portion and outside a region surrounded by a line connecting both ends of the third recessed portion and the fourth recessed portion.

3 Claims, 8 Drawing Sheets

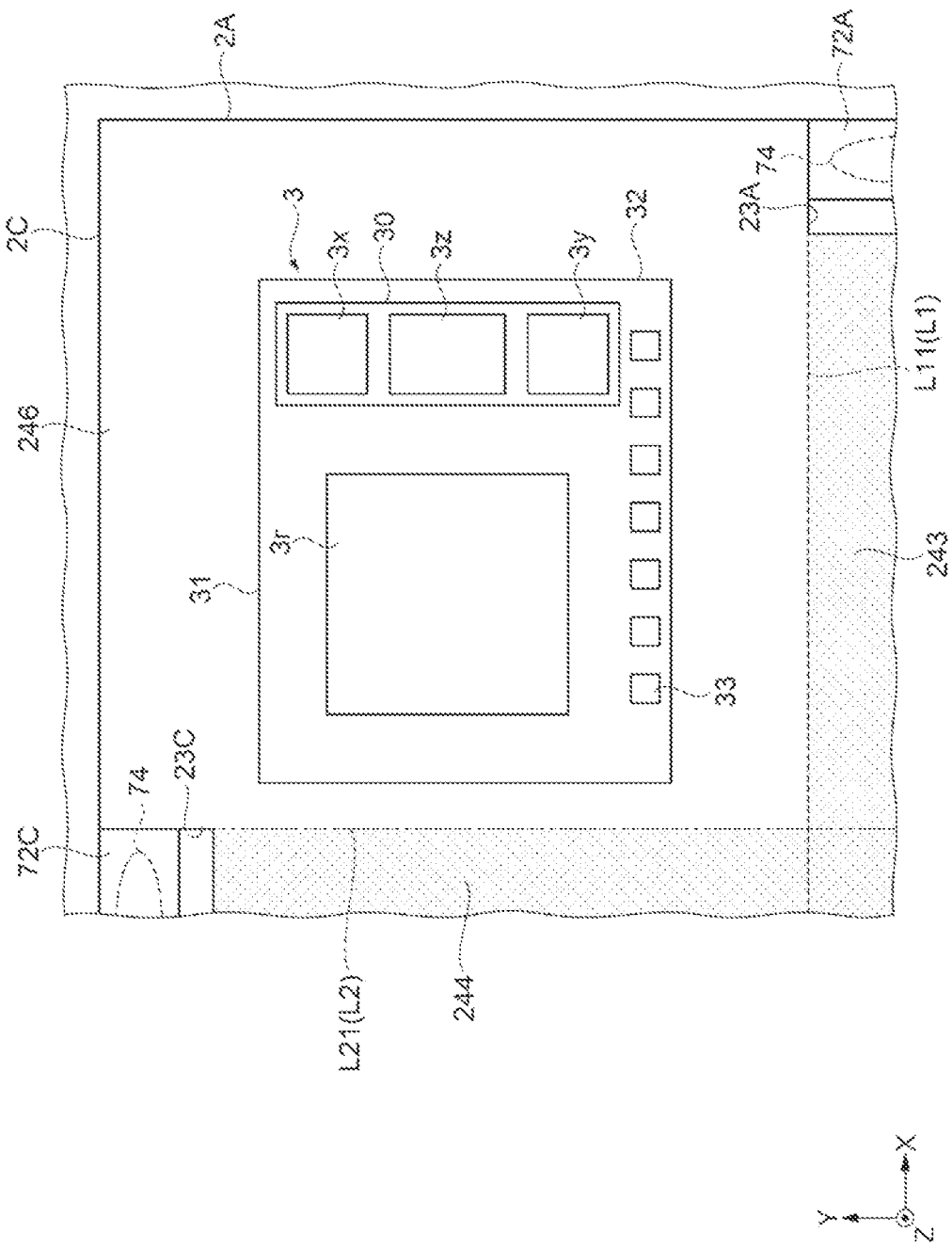

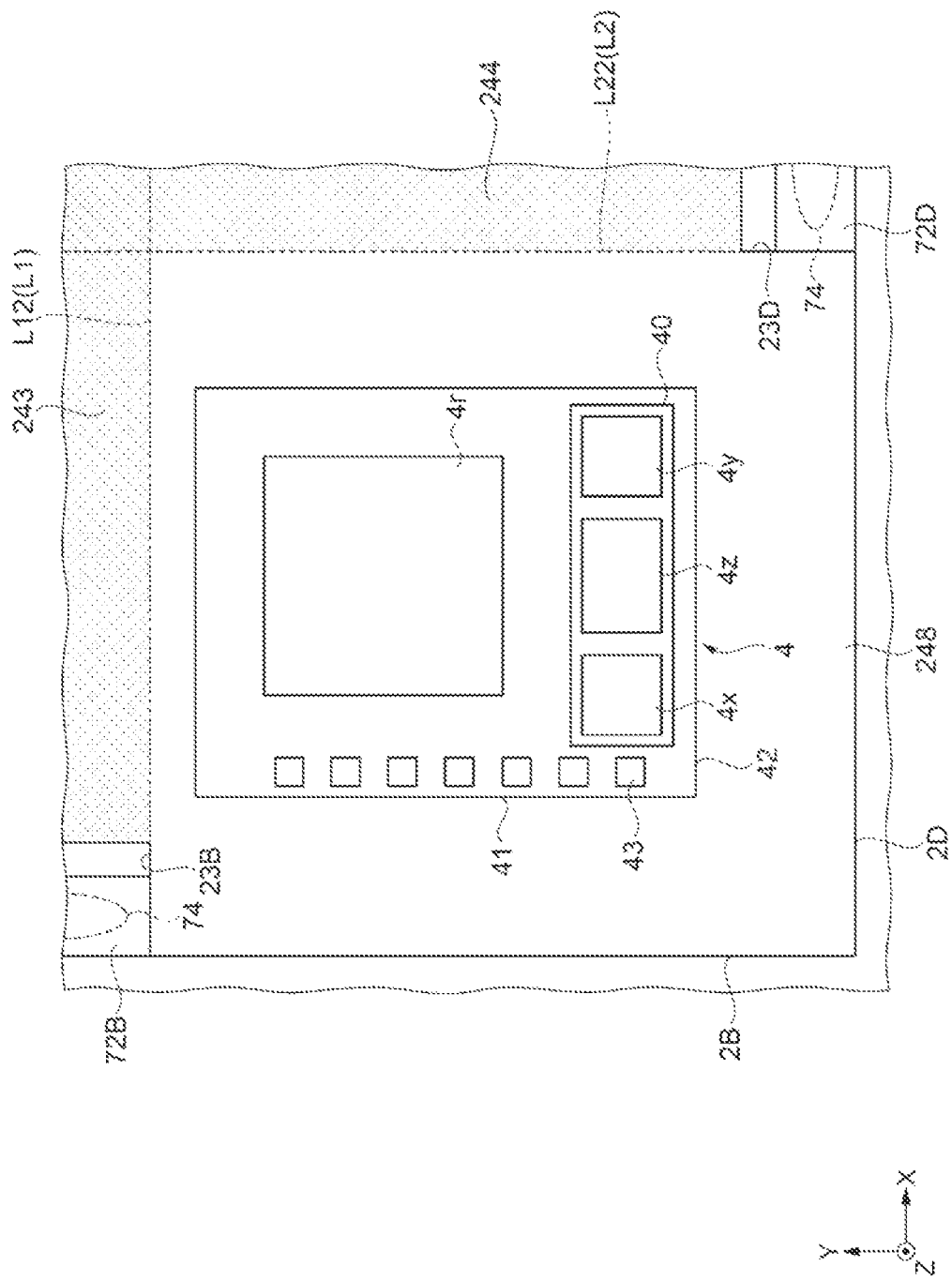

SENSOR MODULE

The present application is based on, and claims priority from JP Application Serial Number 2021-007141, filed Jan. 20, 2021, the disclosure of which is hereby incorporated by reference herein in its entirety.

BACKGROUND

1. Technical Field

The present disclosure relates to a sensor module.

2. Related Art

In the related art, as described in JP-A-2004-31787, an electronic device is known in which a projecting piece provided at a hem portion of a metal cap and an insulating substrate surface are coupled by soldering or the like to dispose the metal cap so as to cover an electronic component mounted on an insulating substrate such as a printed circuit board.

In the electronic device described in JP-A-2004-31787, two opposing projecting pieces projecting from a central portion of the hem portions of the metal cap are coupled to the insulating substrate, and thus, in a step of mounting the electronic device or a thermal cycle in working environment of the electronic device, a stress caused by a difference in thermal expansion coefficient between the metal cap and the insulating substrate is applied to the insulating substrate. Since this stress is strongly applied to the insulating substrate in a linear region connecting the two opposing projecting pieces of the metal cap, when an electronic component such as a piezoelectric vibrator mounted on the insulating substrate is disposed in the linear region connecting two opposing projecting pieces of the metal cap, the stress is also applied to the electronic component, and characteristics of the electronic component change.

Such a change in the characteristics of the electronic component is the same as that of an electronic component other than an oscillator, for example, a sensor using vibration of an inertial element formed from a piezoelectric substrate such as crystal or a semiconductor substrate such as silicon using micro electro mechanical systems (MEMS) technology. In such a sensor, when the stress is applied to the sensor, the characteristics of the sensor may change and the detection accuracy of the sensor may decrease.

SUMMARY

A sensor module includes: a rectangular printed circuit board that has a main surface, a first recessed portion formed at a first side of the main surface, a second recessed portion formed at a second side facing the first side, a third recessed portion formed at a third side adjacent to the first side and the second side, and a fourth recessed portion formed at a fourth side facing the third side; a metal cap that includes a first convex portion bonded to the first recessed portion of the printed circuit board, a second convex portion bonded to the second recessed portion, a third convex portion bonded to the third recessed portion, and a fourth convex portion bonded to the fourth recessed portion; a first inertial sensor that is provided at the main surface of the printed circuit board and that is accommodated between the main surface and the metal cap; and a second inertial sensor that is provided at the main surface of the printed circuit board and that is accommodated between the main surface and the metal cap. In a plan view from a direction orthogonal to the main surface of the printed circuit board, the first inertial sensor and the second inertial sensor are disposed outside a region surrounded by a line segment connecting both ends of the first recessed portion of the printed circuit board in a width direction and both ends of the second recessed portion of the printed circuit board in the width direction, and outside a region surrounded by a line segment connecting both ends of the third recessed portion in the width direction and both ends of the fourth recessed portion in the width direction.

BRIEF DESCRIPTION OF THE DRAWINGS

FIG. 7 is a plan view illustrating a portion G in FIG. 6.

FIG. 8 is a plan view illustrating a portion H in FIG. 6.

DESCRIPTION OF EXEMPLARY EMBODIMENTS

1. First Embodiment

Figure 1:
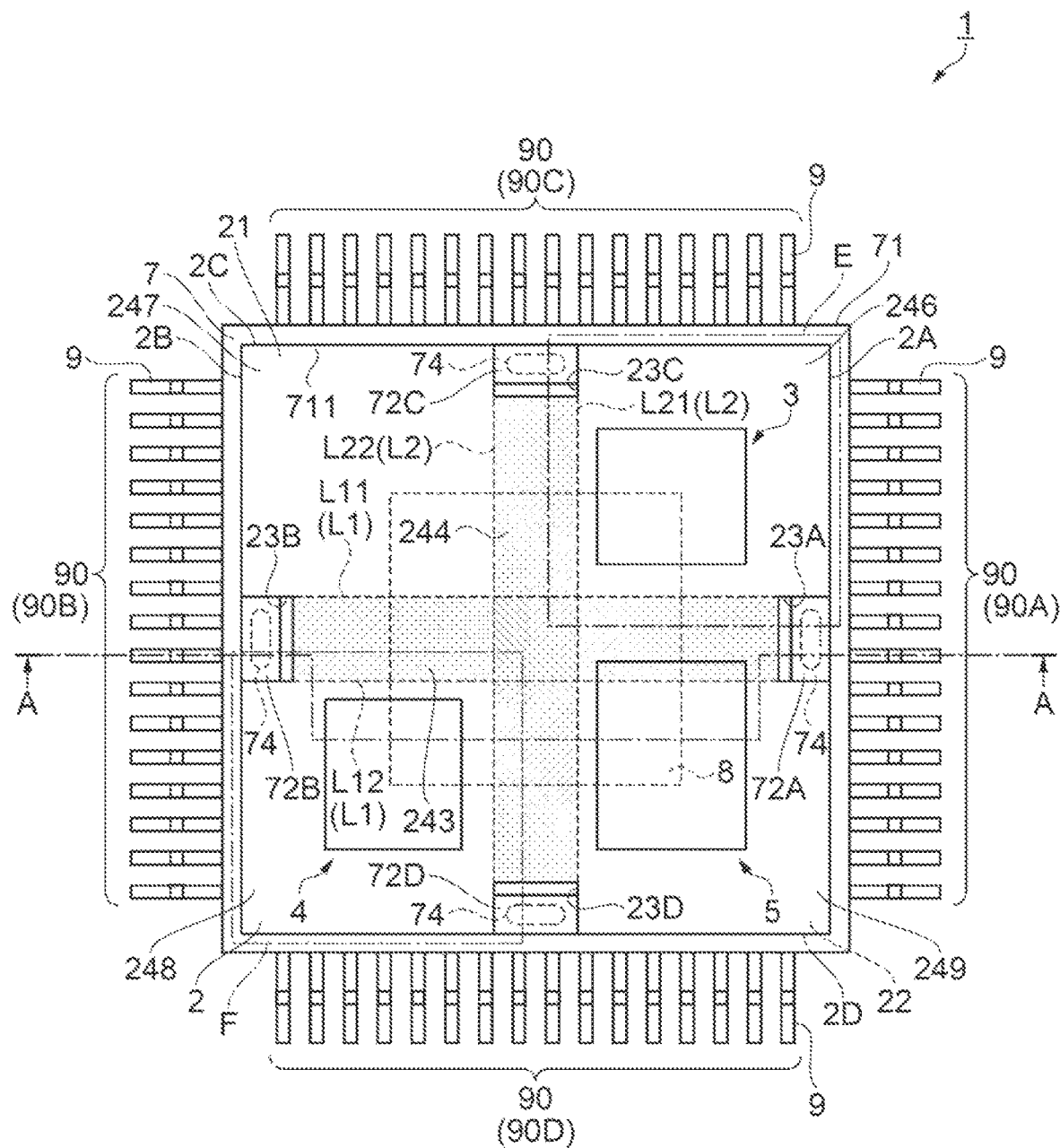
FIG. 1 is a plan view of a sensor module according to a first embodiment.
Figure 4:
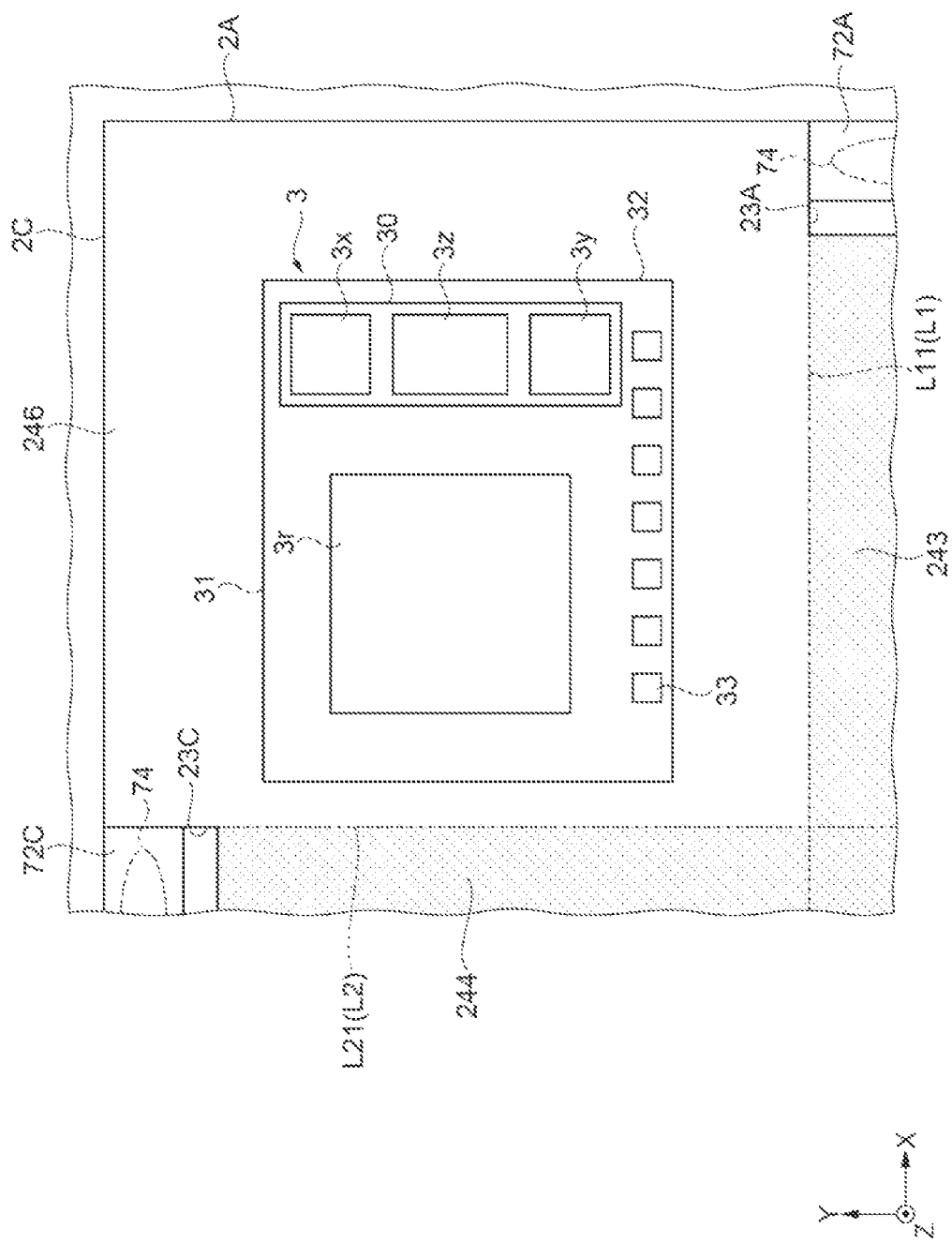
FIG. 4 is a plan view illustrating a portion E in FIG. 1.
Figure 5:
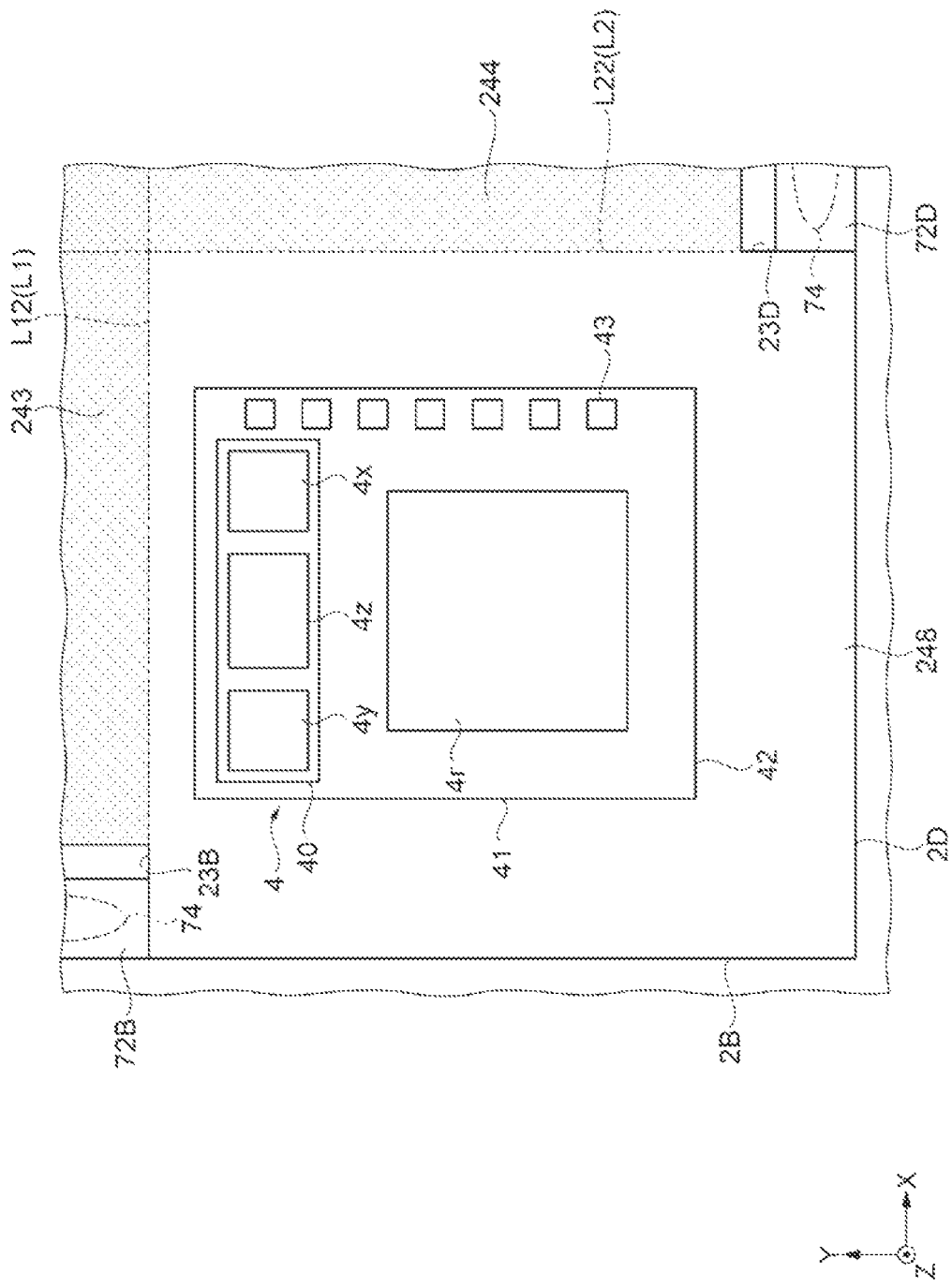
FIG. 5 is a plan view illustrating a portion F in FIG. 1.

A sensor module 1 according to a first embodiment will be described with reference to FIGS. 1 to 5. FIG. 1 illustrates an internal configuration of the sensor module 1 in a state in which a top plate portion 70 of a metal cap 7 is removed for convenience of description. FIGS. 4 and 5 illustrate internal configurations of a first inertial sensor 3 and a second inertial sensor 4, in which components other than an acceleration sensor element, an angular velocity sensor element, and an internal electrode are omitted for convenience of description. The dimensional ratio of components in the drawings is different from the actual dimensional ratio.

In the coordinates illustrated in the drawings, three axes orthogonal to one another are referred to as an X axis, a Y axis, and a Z axis. A direction along the X axis is defined as an "X direction", a direction along the Y axis is defined as a "Y direction", a direction along the Z axis is defined as a "Z direction", and a direction of an arrow is a plus direction. A plus direction in the Z direction is referred to as "upper" or "upward", and a minus direction in the Z direction is referred to as "lower" or "downward". In a plan view from the Z direction, a surface on a plus side in the Z direction is referred to as an upper surface, and a surface on a minus side in the Z direction, which is an opposite-side surface from the upper surface, is referred to as a lower surface.

Figure 2:
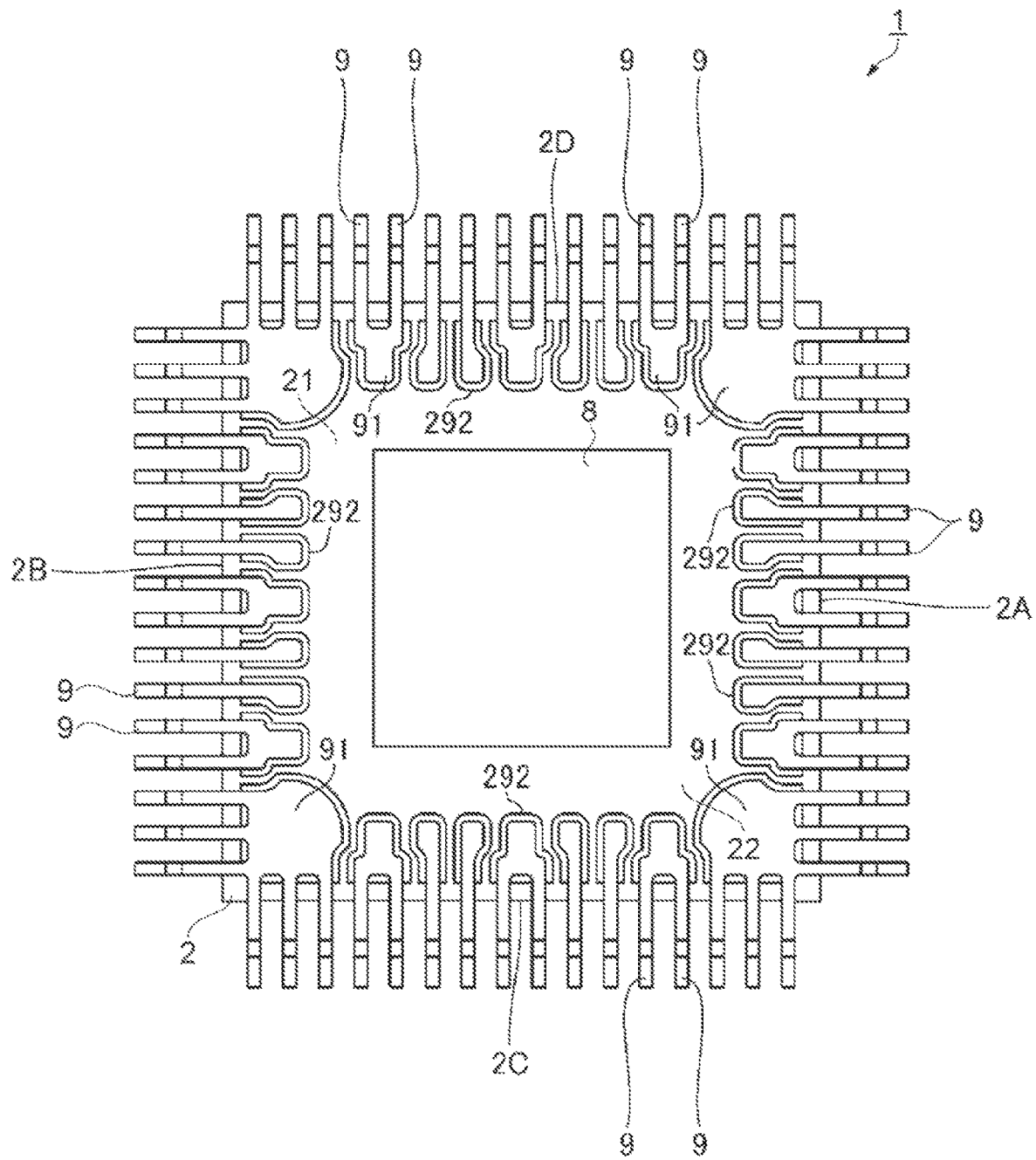
FIG. 2 is a bottom view of the sensor module according to the first embodiment.
Figure 3:
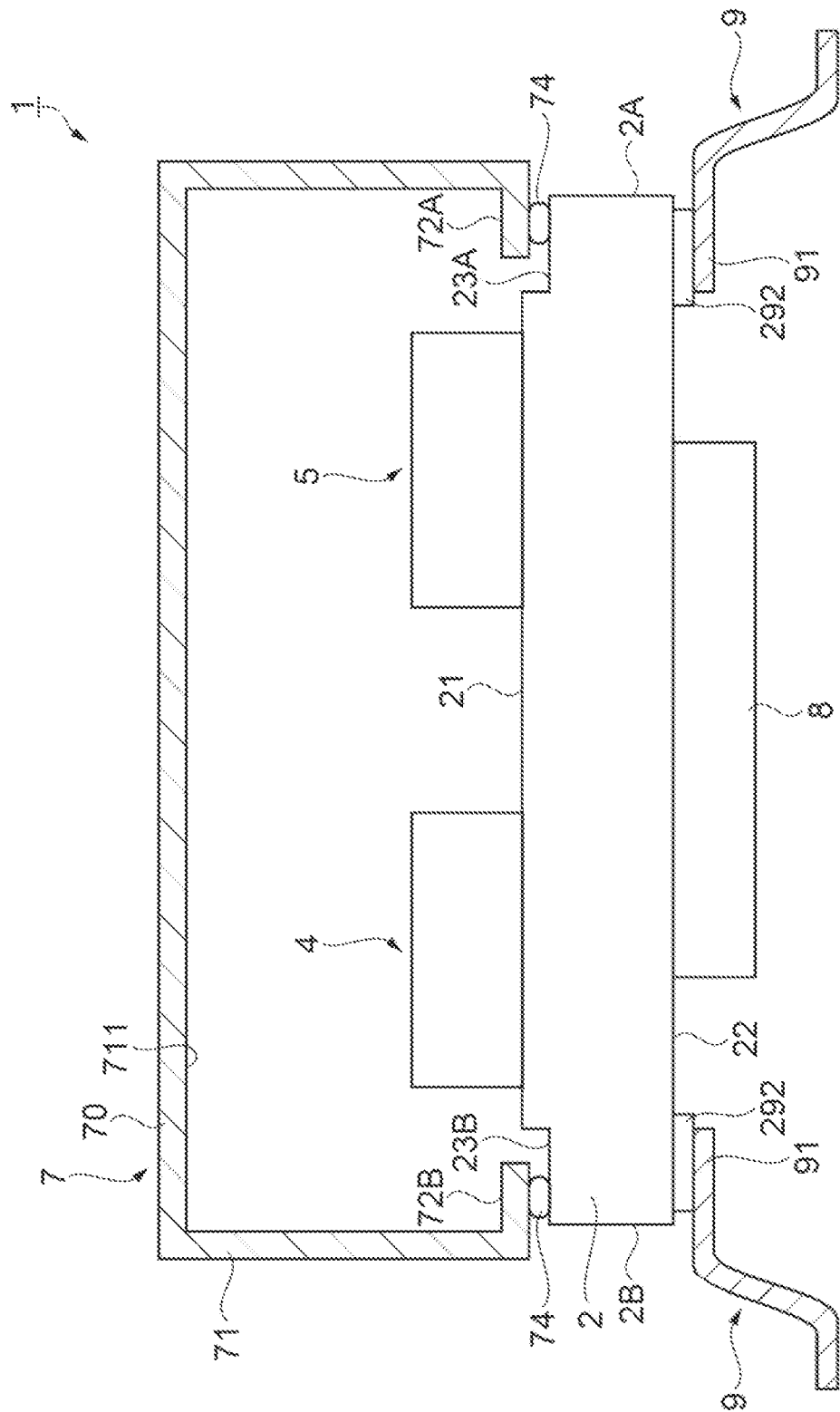
FIG. 3 is a cross-sectional view taken along a line A-A in FIG. 1.

As illustrated in FIGS. 1 to 3, the sensor module 1 includes a printed circuit board 2, a metal cap 7 bonded to a main surface 21 which is an upper surface of the printed circuit board 2, a first inertial sensor 3, a second inertial sensor 4, and an angular velocity sensor 5 that are provided at the main surface 21 of the printed circuit board 2 and that are accommodated between the main surface 21 and the metal cap 7, a semiconductor device 8 mounted at a lower surface 22 of the printed circuit board 2, and a lead group 90 including a plurality of lead terminals 9 electrically coupled to the lower surface 22 of the printed circuit board 2.

The printed circuit board 2 has, in a plan view from the Z direction orthogonal to the main surface 21 of the printed circuit board 2, a plate shape having a rectangular outer shape. As the printed circuit board 2, for example, a ceramic substrate, a glass epoxy substrate, or the like can be used. For convenience of illustration, a wiring formed at the printed circuit board 2 is not illustrated, and only an external coupling terminal 292 disposed at the lower surface 22 is illustrated.

The printed circuit board 2 has, in the plan view from the Z direction, a first side 2A, a second side 2B facing the first side 2A, a third side 2C adjacent to the first side 2A and the second side 2B, and a fourth side 2D facing the third side 2C.

The term "rectangle" is a concept including a square and a rectangle, and further including a shape having a non-rectangular portion different from the rectangle in a part of the rectangle. The non-rectangular portion is, for example, a portion in which a corner of a rectangle is chamfered in a curved shape or a linear shape, a convex portion in which a part of a side surrounding the rectangle protrudes to the outside of the rectangle, a recessed portion such as a notch recessed to the inside of the rectangle, or the like. Accordingly, each side constituting the rectangle may be divided by the non-rectangular portion.

"Adjacent to" is a concept including not only a case in which two sides intersecting each other among the sides constituting the rectangle are in direct contact with each other, but also a case in which the two sides are in indirect contact with each other via the non-rectangular portion. For example, a case that the first side 2A and the third side 2C are adjacent to each other is not limited to a case in which the first side 2A and the third side 2C are in contact with each other at the corners of the rectangle, and may be in contact with each other via the non-rectangular portion such as a portion where the corners of the rectangle are chamfered.

In the main surface 21 of the printed circuit board 2, a first recessed portion 23A is formed at the first side 2A, a second recessed portion 23B is formed at the second side 2B, a third recessed portion 23C is formed at the third side 2C, and a fourth recessed portion 23D is formed at the fourth side 2D. In the present embodiment, the recessed portions 23A, 23B, 23C, and 23D are respectively formed in central portions of the sides 2A, 2B, 2C, and 2D, but may be formed in portions other than the central portions of the sides 2A, 2B, 2C, and 2D.

Next, each portion located at a main surface 21 side of the printed circuit board 2 will be described.

As illustrated in FIGS. 1 and 3, the metal cap 7 is bonded to the main surface 21 of the printed circuit board 2. The first inertial sensor 3, the second inertial sensor 4, and the angular velocity sensor 5 are provided at the main surface 21 of the printed circuit board 2. The metal cap 7 is bonded to the main surface 21 of the printed circuit board 2, so that the first inertial sensor 3, the second inertial sensor 4, and the angular velocity sensor 5 are accommodated between the main surface 21 of the printed circuit board 2 and the metal cap 7.

The metal cap 7 has, in the plan view from the Z direction, a rectangular shape substantially similar to the printed circuit board 2. As the metal cap 7, for example, a 42 alloy, which is an iron-nickel alloy, can be used.

The metal cap 7 includes the top plate portion 70, a side wall 71 extending downward from an outer peripheral edge of the top plate portion 70, a recessed portion 711 formed by the top plate portion 70 and the side wall 71, and a first convex portion 72A, a second convex portion 72B, a third convex portion 72C, and a fourth convex portion 72D that protrude inward from a lower end portion of the side wall 71.

The metal cap 7 is disposed at the main surface 21 of the printed circuit board 2 so as to accommodate the first inertial sensor 3, the second inertial sensor 4, and the angular velocity sensor 5 in the recessed portion 711.

In the plan view from the Z direction, the convex portions 72A, 72B, 72C, and 72D of the metal cap 7 respectively overlap the recessed portions 23A, 23B, 23C, and 23D of the printed circuit board 2.

The first convex portion 72A of the metal cap 7 is bonded to the first recessed portion 23A of the printed circuit board 2 via an adhesive member 74. Similarly, the second convex portion 72B of the metal cap 7 is bonded to the second recessed portion 23B of the printed circuit board 2 via the adhesive member 74, the third convex portion 72C is bonded to the third recessed portion 23C via the adhesive member 74, and the fourth convex portion 72D is bonded to the fourth recessed portion 23D via the adhesive member 74.

As the adhesive member 74, a resin adhesive made of an epoxy resin, a urethane resin, a silicone resin, or the like can be used. The adhesive member 74 may have electrical conductivity. As the adhesive member 74, for example, solder or the like may be used in addition to the resin adhesive.

The first inertial sensor 3 and the second inertial sensor 4 are so-called six-axis inertial sensors that detect angular velocities around three axes which are the X axis, the Y axis, and the Z axis and accelerations in the directions along the three axes.

The angular velocity sensor 5 is provided to accurately detect a desired angular velocity around a detection axis among the three axes which are the X axis, the Y axis, and the Z axis. In the present embodiment, the angular velocity sensor 5 detects an angular velocity around the Z axis. The angular velocity sensor 5 may be omitted.

Here, a disposition of the first inertial sensor 3 and the second inertial sensor 4 according to the present embodiment will be described.

As illustrated in FIG. 1, in the plan view from the Z direction orthogonal to the main surface 21 of the printed circuit board 2, the first inertial sensor 3 and the second inertial sensor 4 are disposed outside a region 243 surrounded by a line segment L1 connecting both ends of the first recessed portion 23A of the printed circuit board 2 in a width direction and both ends of the second recessed portion 23B of the printed circuit board 2 in the width direction, and outside a region 244 surrounded by a line segment L2 connecting both ends of the third recessed portion 23C of the printed circuit board 2 in the width direction and both ends of the fourth recessed portion 23D of the printed circuit board 2 in the width direction.

The line segment L1 connecting both ends of the first recessed portion 23A of the printed circuit board 2 in the width direction and both ends of the second recessed portion 23B of the printed circuit board 2 in the width direction includes, in the plan view from the Z direction, a first line segment L11 connecting end portions on the plus side in the Y direction of the first recessed portion 23A and the second recessed portion 23B in the width direction, and a second line segment L12 connecting end portions on the minus side in the Y direction of the first recessed portion 23A and the second recessed portion 23B in the width direction. The first line segment L11 and the second line segment L12 do not intersect with each other.

Specifically, in the plan view from the Z direction, the region 243 surrounded by the line segment L1 connecting both ends of the first recessed portion 23A of the printed circuit board 2 in the width direction and both ends of the second recessed portion 23B of the printed circuit board 2 in the width direction is a region surrounded by the first line segment L11, the second line segment L12, an outer edge of the first recessed portion 23A in the width direction, and an outer edge of the second recessed portion 23B in the width direction.

The line segment L2 connecting both ends of the third recessed portion 23C of the printed circuit board 2 in the width direction and both ends of the fourth recessed portion 23D of the printed circuit board 2 in the width direction includes, in the plan view from the Z direction, a third line segment L21 connecting the ends on the plus side in the X direction of the third recessed portion 23C and the fourth recessed portion 23D in the width direction, and a fourth line segment L22 connecting the ends on the minus side in the X direction of the third recessed portion 23C and the fourth recessed portion 23D in the width direction. The third line segment L21 and the fourth line segment L22 do not intersect with each other.

Specifically, the region 244 surrounded by the line segment L2 connecting both ends of the third recessed portion 23C of the printed circuit board 2 in the width direction and both ends of the fourth recessed portion 23D of the printed circuit board 2 in the width direction is a region surrounded by the third line segment L21, the fourth line segment L22, an outer edge of the third recessed portion 23C in the width direction, and an outer edge of the fourth recessed portion 23D in the width direction.

The region 243 surrounded by the line segment L1 connecting both ends of the first recessed portion 23A of the printed circuit board 2 in the width direction and both ends of the second recessed portion 23B of the printed circuit board 2 in the width direction extends along the X direction in the plan view from the Z direction. The region 244 surrounded by the line segment L2 connecting both ends of the third recessed portion 23C of the printed circuit board 2 in the width direction and both ends of the fourth recessed portion 23D of the printed circuit board 2 in the width direction extends along the Y direction in the plan view from the Z direction.

The region 243 surrounded by the line segment L1 connecting both ends of the first recessed portion 23A of the printed circuit board 2 in the width direction and both ends of the second recessed portion 23B of the printed circuit board 2 in the width direction, and the region 244 surrounded by the line segment L2 connecting both ends of the third recessed portion 23C of the printed circuit board 2 in the width direction and both ends of the fourth recessed portion 23D of the printed circuit board 2 in the width direction intersect with each other at a central portion of the printed circuit board 2. A shape, in which the region 243 surrounded by the line segment L1 connecting both ends of the first recessed portion 23A in the width direction and both ends of the second recessed portion 23B in the width direction and the region 244 surrounded by the line segment L2 connecting both ends of the third recessed portion 23C in the width direction and both ends of the fourth recessed portion 23D in the width direction are superposed, is a cross shape.

In the present embodiment, as described above, the main surface 21 of the printed circuit board 2 is divided into a cross shape by the region 243 surrounded by the line segment L1 and the region 244 surrounded by the line segment L2. The main surface 21 of the printed circuit board 2 includes the region 243 surrounded by the line segment L1, the region 244 surrounded by the line segment L2, and a first mounting region 246, a second mounting region 247, a third mounting region 248, and a fourth mounting region 249 that are divided by the region 243 and the region 244. In the plan view from the Z direction, the first mounting region 246, the second mounting region 247, the third mounting region 248, and the fourth mounting region 249 are regions outside the region 243 surrounded by the line segment L1 and the region 244 surrounded by the line segment L2.

Specifically, in the plan view from the Z direction, the first mounting region 246 is a region on the plus side in the Y direction with respect to the first line segment L11 and on the plus side in the X direction with respect to the third line segment L21. Similarly, the second mounting region 247 is a region on the plus side in the Y direction with respect to the first line segment L11 and on the minus side in the X direction with respect to the fourth line segment L22, the third mounting region 248 is a region on the minus side in the Y direction with respect to the second line segment L12 and on the minus side in the X direction with respect to the fourth line segment L22, and the fourth mounting region 249 is a region on the minus side in the Y direction with respect to the second line segment L12 and on the plus side in the X direction with respect to the third line segment L21.

The region 243 surrounded by the line segment L1 connecting both ends of the first recessed portion 23A of the printed circuit board 2 in the width direction and both ends of the second recessed portion 23B of the printed circuit board 2 in the width direction, and the region 244 surrounded by the line segment L2 connecting both ends of the third recessed portion 23C of the printed circuit board 2 in the width direction and both ends of the fourth recessed portion 23D of the printed circuit board 2 in the width direction are regions in which stress due to a difference in thermal expansion coefficient between the metal cap 7 and the printed circuit board 2 is strongly applied to the printed circuit board 2.

The first mounting region 246, the second mounting region 247, the third mounting region 248, and the fourth mounting region 249 are regions in which the stress due to the difference in thermal expansion coefficient between the metal cap 7 and the printed circuit board 2 is less likely to be applied to the printed circuit board 2. That is, the first mounting region 246, the second mounting region 247, the third mounting region 248, and the fourth mounting region 249 are regions suitable for disposing the first inertial sensor 3 and the second inertial sensor 4 on the main surface 21 of the printed circuit board 2.

In the present embodiment, the first inertial sensor 3 is disposed in the first mounting region 246, and the second inertial sensor 4 is disposed in the third mounting region 248. However, the disposition of the first inertial sensor 3 and the second inertial sensor 4 is not limited thereto, and the first inertial sensor 3 and the second inertial sensor 4 may be disposed in any of the first mounting region 246, the second mounting region 247, the third mounting region 248, and the fourth mounting region 249.

As described above, in the plan view from the Z direction, the first inertial sensor 3 and the second inertial sensor 4 are disposed in the mounting regions 246, 247, 248, and 249 outside the region 243 surrounded by the line segment L1 connecting both ends of the first recessed portion 23A of the printed circuit board 2 in the width direction and both ends of the second recessed portion 23B of the printed circuit board 2 in the width direction and the region 244 surrounded by the line segment L2 connecting both ends of the third recessed portion 23C in the width direction and both ends of the fourth recessed portion 23D in the width direction, so that the stress caused by the difference in thermal expansion coefficient between the metal cap 7 and the printed circuit board 2 is less likely to be applied to the first inertial sensor 3 and the second inertial sensor 4. Accordingly, even if working environment or the like of the sensor module 1 changes, detection accuracy of the first inertial sensor 3 and the second inertial sensor 4 is less likely to decrease, and the sensor module 1 having high accuracy can be implemented.

Next, basic configurations of the first inertial sensor 3 and the second inertial sensor 4 will be described.

As illustrated in FIGS. 4 and 5, the first inertial sensor 3 and the second inertial sensor 4 have a similar basic configuration, and in the plan view from the Z direction, the second inertial sensor 4 is mounted in a posture in which the first inertial sensor 3 is rotated counterclockwise by 90 degrees.

As illustrated in FIG. 4, the first inertial sensor 3 has, in the plan view from the Z direction, a rectangular outer shape formed by being surrounded by a long side 31 and a short side 32 having a length different from that of the long side 31. In the present embodiment, the long side 31 is parallel to the X direction, and the short side 32 is parallel to the Y direction.

The first inertial sensor 3 includes a first acceleration sensor element 30, a first angular velocity sensor element 3r, and a plurality of first internal electrodes 33 electrically coupled to the first acceleration sensor element 30 and the first angular velocity sensor element 3r by a wiring which is not illustrated. In the present embodiment, the first acceleration sensor element 30 and the first angular velocity sensor element 3r are each formed using a silicon substrate, and may be formed using a semiconductor substrate other than silicon or a piezoelectric substrate such as crystal.

The first acceleration sensor element 30 includes an X-axis acceleration sensor element 3x that detects acceleration in the X direction along the long side 31, a Z-axis acceleration sensor element 3z that detects acceleration in the Z direction perpendicular to a plane including the long side 31 and the short side 32, and a Y-axis acceleration sensor element 3y that detects acceleration in the Y direction along the short side 32. In the present embodiment, the first acceleration sensor element 30 includes the X-axis acceleration sensor element 3x, the Z-axis acceleration sensor element 3z, and the Y-axis acceleration sensor element 3y, and the first acceleration sensor element 30 may have one or more of the X-axis acceleration sensor element 3x, the Z-axis acceleration sensor element 3z, and the Y-axis acceleration sensor element 3y.

In the present embodiment, the X-axis acceleration sensor element 3x, the Z-axis acceleration sensor element 3z, and the Y-axis acceleration sensor element 3y are disposed side by side in the Y direction along the short side 32 in order from the plus side in the Y direction toward the minus side in the Y direction. However, the disposition of the X-axis acceleration sensor element 3x, the Z-axis acceleration sensor element 3z, and the Y-axis acceleration sensor element 3y is not limited thereto, for example, the X-axis acceleration sensor element 3x, the Z-axis acceleration sensor element 3z, and the Y-axis acceleration sensor element 3y may be disposed side by side in the X direction along the long side 31.

The first angular velocity sensor element 3r is a three-axis angular velocity sensor element that detects an angular velocity around each of the X axis, the Y axis, and the Z axis. The first acceleration sensor element 30 and the first angular velocity sensor element 3r are disposed side by side in the X direction along the long side 31. The first angular velocity sensor element 3r may be omitted.

Here, a disposition of the first acceleration sensor element 30 and the first internal electrode 33 will be described.

The plurality of first internal electrodes 33 are disposed side by side in the X direction along the long side 31. The first acceleration sensor element 30 and the plurality of first internal electrodes 33 are disposed side by side in the Y direction which is a direction along the short side 32.

In the present embodiment, as described above, the first acceleration sensor element 30 and the plurality of first internal electrodes 33 are disposed side by side in the Y direction serving as a first direction. Further, the first acceleration sensor element 30 is disposed, in the Y direction, at a position that is closer to the third side 2C, which is an outer edge of the printed circuit board 2, than is the first internal electrode 33. Accordingly, the stress caused by the difference in the thermal expansion coefficient between the metal cap 7 and the printed circuit board 2 is less likely to be applied to the first acceleration sensor element 30, and detection accuracy of acceleration of the first inertial sensor 3 is further less likely to decrease.

As illustrated in FIG. 5, the second inertial sensor 4 has, in the plan view from the Z direction, a rectangular outer shape formed by being surrounded by a long side 41 and a short side 42 having a length different from that of the long side. In the present embodiment, the long side 41 is parallel to the Y direction, and the short side 42 is parallel to the X direction.

The second inertial sensor 4 includes a second acceleration sensor element 40, a second angular velocity sensor element 4r, and a plurality of second internal electrodes 43 electrically coupled to the second acceleration sensor element 40 and the second angular velocity sensor element 4r by a wiring which is not illustrated.

The second acceleration sensor element 40 includes a Y-axis acceleration sensor element 4y that detects acceleration in the Y direction along the long side 41, a Z-axis acceleration sensor element 4z that detects acceleration in the Z direction perpendicular to a plane including the long side 41 and the short side 42, and an X-axis acceleration sensor element 4x that detects acceleration in the X direction along the short side 42.

In the present embodiment, the Y-axis acceleration sensor element 4y, the Z-axis acceleration sensor element 4z, and the X-axis acceleration sensor element 4x are disposed in the X direction along the short side 42 in order from the minus side in the X direction toward the plus side in the X direction.

The second angular velocity sensor element 4r is a three-axis angular velocity sensor element that detects an angular velocity around each of the X axis, the Y axis, and the Z axis. The second acceleration sensor element 40 and the second angular velocity sensor element 4r are disposed side by side in the Y direction along the long side 41.

Here, a disposition of the second acceleration sensor element 40 and the second internal electrodes 43 will be described.

The plurality of second internal electrodes 43 are disposed side by side in the Y direction along the long side 41. The second acceleration sensor element 40 and the plurality of second internal electrodes 43 are disposed side by side in the X direction which is a direction along the short side 42.

In the present embodiment, as described above, the second acceleration sensor element 40 and the plurality of second internal electrodes 43 are disposed side by side in the X direction serving as a second direction. Further, the second acceleration sensor element 40 is disposed, in the X direction, at a position that is closer to the second side 2B, which is an outer edge of the printed circuit board 2, than is the second internal electrode 43. Accordingly, the stress caused by the difference in the thermal expansion coefficient between the metal cap 7 and the printed circuit board 2 is less likely to be applied to the second acceleration sensor element 40, and detection accuracy of acceleration of the second inertial sensor 4 is further less likely to decrease.

As described above, in the present embodiment, the first acceleration sensor element 30 is disposed at a position that is closer to the third side 2C, which is an outer edge of the printed circuit board 2, than are the plurality of first internal electrodes 33, so that the detection accuracy of the acceleration of the first inertial sensor 3 is further less likely to decrease. Similarly, since the second acceleration sensor element 40 is disposed at a position that is closer to the second side 2B, which is an outer edge of the printed circuit board 2, than are the plurality of second internal electrodes 43, the detection accuracy of the acceleration of the second inertial sensor 4 is further less likely to decrease. Accordingly, in the present embodiment, since the detection accuracy of the acceleration of each of the first inertial sensor 3 and the second inertial sensor 4 can be further less likely to decrease, the sensor module 1 having higher accuracy can be implemented.

The portions located at the main surface 21 side, which is the upper surface of the printed circuit board 2, are described above. Next, portions located at a lower surface 22 side of the printed circuit board 2 will be described.

As illustrated in FIGS. 2 and 3, the semiconductor device 8 is mounted at the lower surface 22 of the printed circuit board 2. The semiconductor device 8 is electrically coupled to the first inertial sensor 3, the second inertial sensor 4, and the angular velocity sensor 5 via a wiring that is not illustrated and that is provided at the printed circuit board 2. The semiconductor device 8 is a circuit element, and is, for example, a configuration in which a bare chip, which is a semiconductor chip, is molded. The semiconductor device 8 controls driving of the first inertial sensor 3, the second inertial sensor 4, and the angular velocity sensor 5, executes various types of processing such as sampling processing, zero point correction, sensitivity adjustment, filter processing, and temperature correction on detection signals from the first inertial sensor 3, the second inertial sensor 4, and the angular velocity sensor 5, and outputs the processed detection signals.

The semiconductor device 8 combines the detection signals that have the same detection axis and that are output from the first inertial sensor 3 and the second inertial sensor 4, so that noise included in the detection signals can be reduced and signal quality can be improved. For example, the semiconductor device 8 combines a detection signal in the X direction output from the X-axis acceleration sensor element 3x of the first inertial sensor 3 and a detection signal in the X direction output from the X-axis acceleration sensor element 4x of the second inertial sensor 4, so that noise uncorrelated with the detection signals, such as thermal noise included in the detection signals, can be reduced, and the signal quality can be improved.

The external coupling terminal 292 electrically coupled to the semiconductor device 8 via a wiring which is not illustrated is provided at the lower surface 22 of the printed circuit board 2. The external coupling terminal 292 is electrically coupled to the lead group 90 via a bonding member having electrical conductivity, which is not illustrated, such as solder.

Next, the lead group 90 will be described. As illustrated in FIG. 1, the lead group 90 includes, at the lower surface 22 of the printed circuit board 2, a first lead group 90A including a plurality of lead terminals 9 disposed along the first side 2A, a second lead group 90B including a plurality of lead terminals 9 disposed along the second side 2B, a third lead group 90C including a plurality of lead terminals 9 disposed along the third side 2C, and a fourth lead group 90D including a plurality of lead terminals 9 disposed along the fourth side 2D.

The plurality of lead terminals 9 included in the lead group 90 are formed by, for example, cutting a lead frame at the time of manufacturing, and are formed of, for example, an iron-based material or a copper-based material. As illustrated in FIGS. 2 and 3, each of the plurality of lead terminals 9 includes a coupling portion 91 coupled to the printed circuit board 2. The coupling portion 91 is electrically coupled to, via a bonding member having electrical conductivity, which is not illustrated, such as solder, the external coupling terminal 292 formed at the lower surface 22 of the printed circuit board 2.

As described above, according to the present embodiment, the following effect can be attained.

In the plan view from the Z direction orthogonal to the main surface 21 of the printed circuit board 2, the first inertial sensor 3 and the second inertial sensor 4 are disposed outside the region 243 surrounded by the line segment L1 connecting both ends of the first recessed portion 23A of the printed circuit board 2 in the width direction and both ends of the second recessed portion 23B of the printed circuit board 2 in the width direction, and outside the region 244 surrounded by the line segment L2 connecting both ends of the third recessed portion 23C in the width direction and both ends of the fourth recessed portion 23D in the width direction. Accordingly, the stress caused by the difference in thermal expansion coefficient between the metal cap 7 and the printed circuit board 2 is less likely to be applied to the first inertial sensor 3 and the second inertial sensor 4. Therefore, the detection accuracy of the first inertial sensor 3 and the second inertial sensor 4 is stabilized, and the sensor module 1 having high accuracy can be implemented.

2. Second Embodiment

Figure 6:
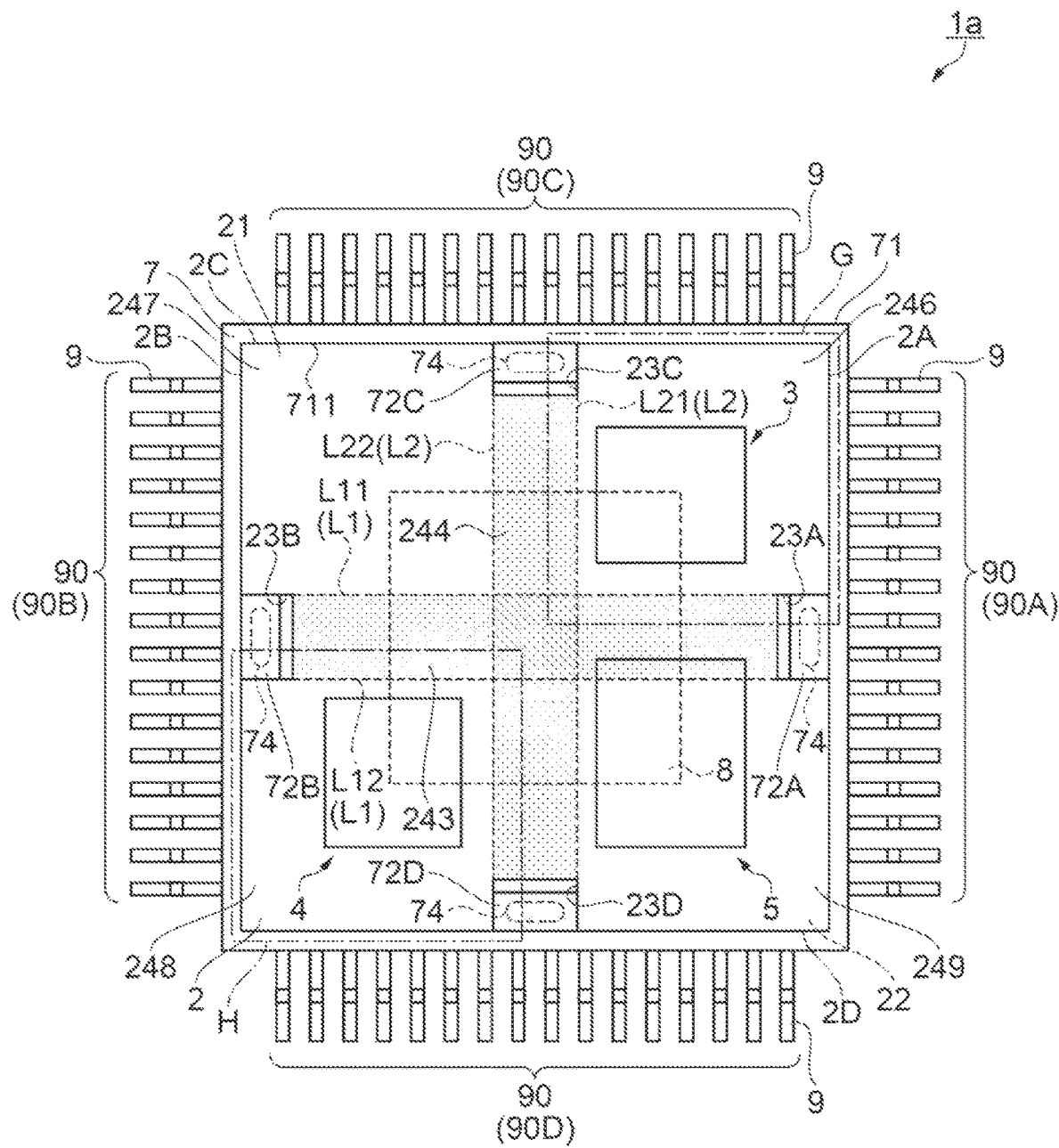
FIG. 6 is a plan view of a sensor module according to a second embodiment.

Next, a sensor module 1a according to a second embodiment will be described with reference to FIGS. 6 to 8. In the following description, differences from the first embodiment described above will be mainly described, and the same configurations as those according to the first embodiment are denoted by the same reference numerals, and redundant description thereof will be omitted.

As illustrated in FIG. 8, in the sensor module 1a according to the present embodiment, the posture of the second inertial sensor 4 is different from that according to the first embodiment. Specifically, in the plan view from the Z direction, the second inertial sensor 4 is mounted in a posture in which the first inertial sensor 3 is rotated clockwise by 90 degrees. As illustrated in FIG. 6, in the sensor module 1a according to the present embodiment, similarly to the first embodiment, the first inertial sensor 3 is disposed in the first mounting region 246, and the second inertial sensor 4 is disposed in the third mounting region 248.

First, a disposition of the first acceleration sensor element 30 and the first angular velocity sensor element 3r in the first inertial sensor 3 will be described.

As illustrated in FIG. 7, the configuration and posture of the first inertial sensor 3 are the same as those according to the first embodiment, and the first acceleration sensor element 30 and the first angular velocity sensor element 3r are disposed side by side in the X direction along the long side 31.

In the present embodiment, as described above, the first acceleration sensor element 30 and the first angular velocity sensor element 3r are disposed side by side in the X direction serving as a third direction. Further, the first acceleration sensor element 30 is disposed, in the X direction, at a position that is closer to the first side 2A, which is an outer edge of the printed circuit board 2, than is the first angular velocity sensor element 3r. Accordingly, the stress caused by the difference in the thermal expansion coefficient between the metal cap 7 and the printed circuit board 2 is less likely to be applied to the first acceleration sensor element 30, and the detection accuracy of the acceleration of the first inertial sensor 3 is further less likely to decrease.

Next, a disposition of the second acceleration sensor element 40 and the second angular velocity sensor element 4r in the second inertial sensor 4 will be described.

As illustrated in FIG. 8, the second acceleration sensor element 40 includes the Y-axis acceleration sensor element 4y that detects the acceleration in the Y direction along the long side 41, the Z-axis acceleration sensor element 4z that detects the acceleration in the Z direction perpendicular to the plane including the long side 41 and the short side 42, and the X-axis acceleration sensor element 4x that detects the acceleration in the X direction along the short side 42. The Y-axis acceleration sensor element 4y, the Z-axis acceleration sensor element 4z, and the X-axis acceleration sensor element 4x are disposed side by side in the X direction along the short side 42 in order from the plus side in the X direction toward the minus side in the X direction.

The second acceleration sensor element 40 and the second angular velocity sensor element 4r are disposed side by side in the Y direction along the long side 41.

In the present embodiment, as described above, the second acceleration sensor element 40 and the second angular velocity sensor element 4r are disposed side by side in the Y direction serving as a fourth direction. The second acceleration sensor element 40 is disposed at a position that is closer to the fourth side 2D, which is an outer edge of the printed circuit board 2, than is the second angular velocity sensor element 4r. Accordingly, the stress caused by the difference in the thermal expansion coefficient between the metal cap 7 and the printed circuit board 2 is less likely to be applied to the second acceleration sensor element 40, and the detection accuracy of the acceleration of the second inertial sensor 4 is further less likely to decrease.

According to the present embodiment, the following effects can be attained in addition to the effect according to the first embodiment.

In the X direction, which is the third direction in which the first acceleration sensor element 30 and the first angular velocity sensor element 3r are disposed side by side, the first acceleration sensor element 30 is disposed at the position that is closer to the first side 2A, which is an outer edge of the printed circuit board 2, than is the first angular velocity sensor element 3r, so that the detection accuracy of the acceleration of the first inertial sensor 3 is further less likely to decrease. Similarly, in the Y direction, which is the fourth direction in which the second acceleration sensor element 40 and the second angular velocity sensor element 4r are disposed side by side, the second acceleration sensor element 40 is disposed at the position closer to the fourth side 2D, which is an outer edge of the printed circuit board 2, than is the second angular velocity sensor element 4r, so that the detection accuracy of the acceleration of the second inertial sensor 4 is further less likely to decrease. Accordingly, since the detection accuracy of the acceleration of each of the first inertial sensor 3 and the second inertial sensor 4 can be further less likely to decrease, the sensor module 1a having higher accuracy can be implemented.

The sensor modules 1 and 1a can be applied to, for example, vehicles such as construction machines and agricultural machines, moving bodies such as robots and drones, and electronic devices such as smartphones and head mounted displays.

What is claimed is:

1. A sensor module, comprising:
   a rectangular printed circuit board that has a main surface, a first recessed portion formed at a first side of the main surface, a second recessed portion formed at a second side facing the first side in an X-axis direction of the rectangular printed circuit board, a third recessed portion formed at a third side adjacent to the first side and the second side, and a fourth recessed portion formed at a fourth side facing the third side in a Y-axis direction of the rectangular printed circuit board;
   a metal cap that includes a first convex portion bonded to the first recessed portion of the printed circuit board, a second convex portion bonded to the second recessed portion, a third convex portion bonded to the third recessed portion, and a fourth convex portion bonded to the fourth recessed portion;
   adhesive members interposed between and contacting the first convex portion and the first recessed portion, the second convex portion and the second recessed portion, the third convex portion and the third recessed portion, and the fourth convex portion and the fourth recessed portion, respectively;
   a first inertial sensor that is provided at the main surface of the printed circuit board and that is accommodated between the main surface and the metal cap; and
   a second inertial sensor that is provided at the main surface of the printed circuit board and that is accommodated between the main surface and the metal cap, wherein
   in a plan view from a Z-axis direction orthogonal to the main surface of the printed circuit board, the first inertial sensor and the second inertial sensor are disposed outside a first region and a second region, wherein
   the first region is defined between a first line segment and a second line segment, the first line segment connecting one end of the first recessed portion of the printed circuit board in the Y-axis direction and one end of the second recessed portion of the printed circuit board in the Y-axis direction, and the second line segment connecting another end of the first recessed portion of the printed circuit board in the Y-axis direction and another end of the second recessed portion of the printed circuit board in the Y-axis direction, and
   the second region is defined between a third line segment and a fourth line segment, the third line segment connecting one end of the third recessed portion in the X-axis direction and one end of the fourth recessed portion in the X-axis direction, and the fourth line segment connecting another end of the third recessed portion in the X-axis direction and another end of the fourth recessed portion in the X-axis direction, and the first region and the second region separate a first mounting region and a second mounting region from each other wherein the first inertial sensor is provided in the first mounting region and the second inertial sensor is provided in the second mounting region.

2. The sensor module according to claim 1, wherein the first inertial sensor includes
- a first acceleration sensor element, and
- a first electrode electrically coupled to the first acceleration sensor element, in the plan view, the first acceleration sensor element and the first electrode are disposed side by side in the Y-axis direction, the first acceleration sensor element is disposed, in the first Y axis direction, at a position that is closer to an outer edge of the printed circuit board, that is a nearest outer edge of the printed circuit board to the first inertial sensor in the Y-axis direction, than is the first electrode, the second inertial sensor includes
- a second acceleration sensor element, and
- a second electrode electrically coupled to the second acceleration sensor element, in the plan view, the second acceleration sensor element and the second electrode are disposed side by side in the X-axis direction, and the second acceleration sensor element is disposed, in the X axis direction, at a position that is closer to an outer edge of the printed circuit board, that is a nearest outer edge of the printed circuit board to the second inertial sensor in the X-axis direction, than is the second electrode.

3. The sensor module according to claim 1, wherein the first inertial sensor includes
- a first acceleration sensor element, and
- a first angular velocity sensor element, in the plan view, the first acceleration sensor element and the first angular velocity sensor element are disposed side by side in the X-axis direction, the first acceleration sensor element is disposed, in the X-axis direction, at a position that is closer to an outer edge of the printed circuit board, that is a nearest outer edge of the printed circuit board to the first inertial sensor in the X-axis direction, than is the first angular velocity sensor element, the second inertial sensor includes
- a second acceleration sensor element, and
- a second angular velocity sensor element, in the plan view, the second acceleration sensor element and the second angular velocity sensor element are disposed side by side in the Y-axis direction, and the second acceleration sensor element is disposed, in the Y-axis direction, at a position that is closer to an outer edge of the printed circuit board, that is a nearest outer edge of the printed circuit board to the second inertial sensor in the Y-axis direction, than is the second angular velocity sensor element.

* * * * *